United States Patent
Tehrani et al.

(10) Patent No.: US 11,708,504 B2
(45) Date of Patent: Jul. 25, 2023

(54) AQUEOUS INKJET INK COMPOSITIONS MADE FROM MONODISPERSE LATEXES

(71) Applicant: Xerox Corporation, Norwalk, CT (US)

(72) Inventors: Sepehr M. Tehrani, North York (CA); Marcel P. Breton, Mississauga (CA); Syed Mohsin Ali, Milton (CA); Carlos Dondon, Mississauga (CA); Biby Esther Abraham, Mississauga (CA); C. Geoffrey Allen, Waterdown (CA); Mihaela Maria Birau, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 203 days.

(21) Appl. No.: 17/229,988

(22) Filed: Apr. 14, 2021

(65) Prior Publication Data

US 2022/0162461 A1 May 26, 2022

Related U.S. Application Data

(63) Continuation-in-part of application No. 17/102,596, filed on Nov. 24, 2020, now abandoned.

(51) Int. Cl.
| | | |
|---|---|---|
| *C09D 11/107* | (2014.01) | |
| *C08F 220/18* | (2006.01) | |
| *C08F 212/14* | (2006.01) | |
| *C08F 222/10* | (2006.01) | |
| *B41J 2/21* | (2006.01) | |
| *C08F 2/26* | (2006.01) | |
| *C08F 212/08* | (2006.01) | |

(Continued)

(52) U.S. Cl.
CPC ............ *C09D 11/107* (2013.01); *B41J 2/2107* (2013.01); *C08F 2/26* (2013.01); *C08F 212/08* (2013.01);

(Continued)

(58) Field of Classification Search
None
See application file for complete search history.

(56) References Cited

U.S. PATENT DOCUMENTS

| 9,371,464 B2 | 6/2016 | Breton et al. |
| 2006/0038867 A1 | 2/2006 | Valentini |

(Continued)

FOREIGN PATENT DOCUMENTS

| EP | 1609827 A1 | 12/2005 |
| EP | 1108758 B1 | 7/2006 |

(Continued)

OTHER PUBLICATIONS

JP2010235895A English Translation (Year: 2010).*
Extended Search Report on European Application 21209712.5, dated Apr. 7, 2022.

*Primary Examiner* — Ling Siu Choi
*Assistant Examiner* — Huihong Qiao
(74) *Attorney, Agent, or Firm* — Bell & Manning, LLC

(57) ABSTRACT

Aqueous inkjet ink compositions are provided. In an embodiment, such a composition comprises water; resin particles; and a colorant; wherein the resin particles comprise a polymerization product of reactants comprising a monomer, an acidic monomer, a multifunctional monomer, and a reactive surfactant, the resin particles having a $D_{(z,\,ave)}$ of no greater than about 150 nm, a $D_{(v,90)}$ of less than about 200 nm, and a polydispersity index (PDI) of no greater than about 0.050. Methods of forming and using the aqueous inkjet ink compositions are also provided.

20 Claims, 3 Drawing Sheets

(51) Int. Cl.
*C08F 220/06* (2006.01)
*C08K 5/37* (2006.01)
*C08L 71/02* (2006.01)
*C09D 11/037* (2014.01)
*C09D 11/32* (2014.01)

(52) U.S. Cl.
CPC .......... *C08F 212/30* (2020.02); *C08F 220/06* (2013.01); *C08F 220/1804* (2020.02); *C08F 222/102* (2020.02); *C08K 5/37* (2013.01); *C08L 71/02* (2013.01); *C09D 11/037* (2013.01); *C09D 11/32* (2013.01); *C08L 2201/52* (2013.01); *C08L 2205/18* (2013.01)

(56) References Cited

U.S. PATENT DOCUMENTS

| | | | |
|---|---|---|---|
| 2006/0199877 A1* | 9/2006 | Sivapackia | C03C 17/00 523/160 |
| 2008/0186373 A1 | 8/2008 | Rolly | |
| 2011/0318551 A1 | 12/2011 | Nakagawa | |
| 2018/0311968 A1* | 11/2018 | Sato | C09C 1/36 |
| 2019/0367753 A1 | 12/2019 | Chopra et al. | |
| 2022/0162349 A1 | 5/2022 | Tehrani et al. | |
| 2022/0162368 A1 | 5/2022 | Tehrani | |
| 2022/0162462 A1 | 5/2022 | Tehrani et al. | |

FOREIGN PATENT DOCUMENTS

| | | | | |
|---|---|---|---|---|
| EP | 2823002 B1 | 5/2016 | | |
| EP | 3095824 | 11/2016 | | |
| EP | 1756237 B1 | 5/2017 | | |
| EP | 3494182 B1 | 4/2020 | | |
| JP | 2010235895 A * | 10/2010 | | B41J 2/01 |
| WO | WO 2011/022001 | 2/2011 | | |
| WO | WO 2014/042651 | 3/2014 | | |
| WO | WO 2014/042653 | 3/2014 | | |
| WO | WO2018/143957 | 8/2018 | | |
| WO | WO2018/143959 | 8/2018 | | |
| WO | WO2018/143962 | 8/2018 | | |

* cited by examiner

AQUEOUS INKJET INK COMPOSITIONS MADE FROM MONODISPERSE LATEXES

CROSS REFERENCE TO RELATED APPLICATIONS

The present application is a continuation-in-part of U.S. patent application Ser. No. 17/102,596, which was filed on Nov. 24, 2020, the entire contents of which are hereby incorporated by reference.

BACKGROUND

Latexes for aqueous inkjet ink compositions are often synthesized through emulsion polymerization or microemulsion polymerization of hydrophobic monomers in water. To render the resin particles of the latex small and colloidally stable, large amounts of surfactants, such as sodium dodecyl sulfonate (SDS) are often used. Excess surfactant in the resulting latex causes problems in formulating the aqueous inkjet ink compositions, such as foaming and reduction in surface tension. The removal of excess surfactant also adds cost, complexity, time, and leads to colloidal instability. In addition, the size distribution of the resin particles of the resulting latex is generally broad. Even a small number of large resin particles can induce particle sedimentation and nozzle clogging during printing of aqueous inkjet ink compositions formed from the latex.

Aqueous inkjet ink compositions generally include water, water-dispersible pigments, hydrophilic solvents, and binding resins. The binding resins may be provided by certain latexes as noted above. Latexes are useful as they can form water-impenetrable films to protect colorant in images printed from the aqueous inkjet ink compositions. However, the addition of latexes to aqueous inkjet ink compositions imposes a level of complexity and tends to compromise printing behavior such as jetting instability, jetting latency, and nozzle clogging. Use of latexes in aqueous inkjet ink compositions also reduces the shelf-life of the compositions.

SUMMARY

The present disclosure provides methods for forming monodisperse latexes. Embodiments of the methods are able to achieve resin particles having a small size and narrow size distribution (e.g., $D_{(z, ave)} \leq 150$ nm, $D_{(v, 90)} < 200$ and PDI$\leq$0.05). This is thought to contribute, at least in part, to greatly improved stability and printing performance of aqueous inkjet ink compositions formed from the latexes. The monodisperse latexes and aqueous inkjet ink compositions are also encompassed by the present disclosure.

Aqueous inkjet ink compositions are provided. In an embodiment, such a composition comprises water; resin particles; and a colorant; wherein the resin particles comprise a polymerization product of reactants comprising a monomer, an acidic monomer, a multifunctional monomer, and a reactive surfactant, the resin particles having a $D_{(z, ave)}$ of no greater than about 150 nm, a $D_{(v, 90)}$ of less than about 200 nm, and a polydispersity index (PDI) of no greater than about 0.050. Methods of forming and using the aqueous inkjet ink compositions are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Monodisperse Latex

Figure 1:
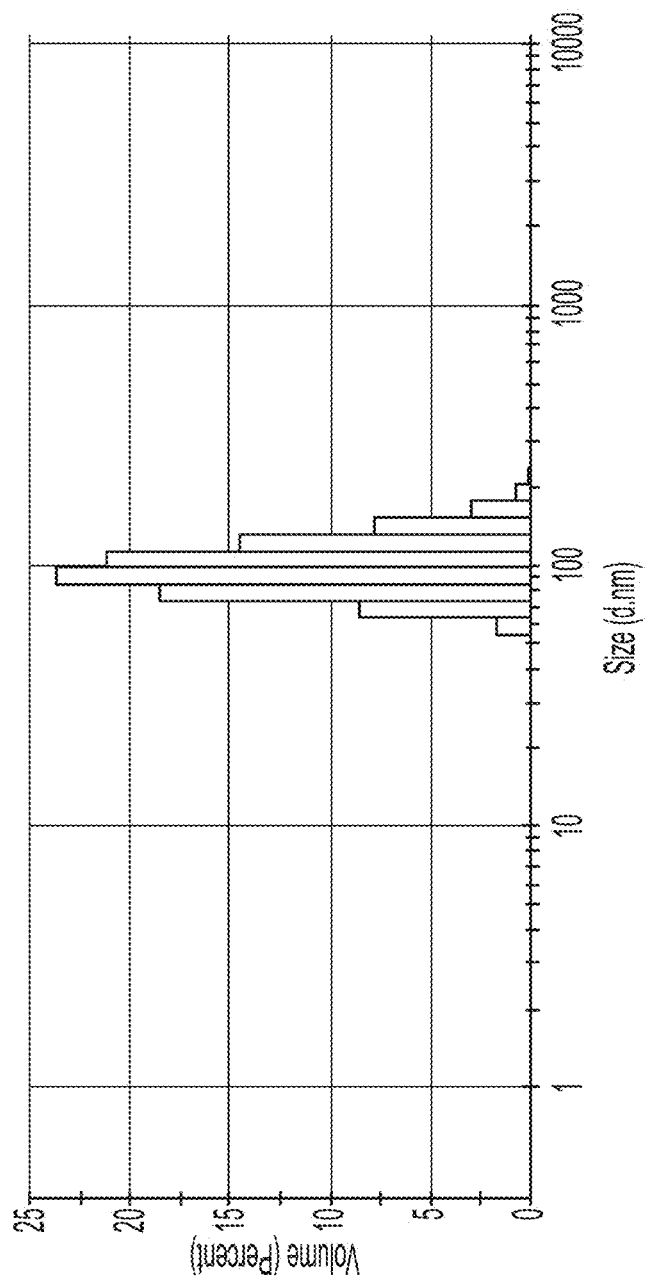
FIG. 1 shows the size distribution of resin particles of a monodisperse latex formed according to an illustrative embodiment of the present methods.

In one aspect, methods for forming a monodisperse latex are provided. The latex comprises resin particles synthesized from certain monomers according to the present methods, which are further described below. The following monomers and combinations thereof may be used (use of "(meth)" as in, e.g., "(meth)acrylate", refers to both acrylate and methacrylate): styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. In embodiments, the monomers used to form the resin particles of the latex comprise a styrene and an alkyl acrylate.

Acidic monomers may be used to form the resin particles of the monodisperse latex, including (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-l-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. These acidic monomers also encompass salts thereof, e.g., salt of a sulfonic acid.

In embodiments, two different acidic monomers are used to form the resin particles of the monodisperse latex, each having a different $pK_a$ value. The $pK_a$ values of the two different acidic monomers may differ from one another by at least 2 units, at least 3 units, at least 4 units, or at least 5 units. In embodiments, the two different acidic monomers are present in a monomer emulsion used to form the resin particles at a weight ratio in a range of from 0.1 to 10. This includes a range of from 0.5 to 8 and from 1 to 6. In embodiments, the two different types of acidic monomers used to form the resin particles comprise a methacrylic acid and a sulfonic acid.

Hydrophilic monomers may be used to form the resin particles of the monodisperse latex. The term "hydrophilic monomer" is distinguished from the "acidic monomers" described above. That is, although the selected acidic monomers may also be hydrophilic, these terms refer to different, chemically distinct species of monomers. The hydrophilic monomers are generally monofunctional, i.e., comprising a single polymerizable group. Illustrative hydrophilic monomers include hydroxyethyl (meth)acrylate, n-hydroxyethyl (meth)acrylamide, hydroxypropyl (metha)crylate, and hydroxypropyl (meth)acrylamide, ethylene glycol (meth) acrylate, propylene glycol (meth)acrylate, poly(ethylene glycol) (meth)acrylate having a molecular weight from 200 g/mol to 2000 g/mol, and poly(propylene glycol) (meth) acrylate having a molecular weight from 200 g/mol to 2000 g/mol, and combinations thereof In embodiments, the hydrophilic monomers used to form the resin particles comprise a poly(propylene glycol) methacrylate.

Multifunctional monomers may be used to form the resin particles of the monodisperse latex, i.e., those comprising more than one polymerizable group (e.g., 2, 3, 4). These are useful as they facilitate crosslinking within the resin particles. Illustrative multifunctional monomers include difunctional monomers such as a poly(ethylene glycol) di(meth) acrylate, e.g., poly(ethylene glycol) diacrylate having a molecular weight from 200 g/mol to 2000 g/mol. These difunctional monomers may also be considered to be hydrophilic as noted above. Other hydrophilic difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other illustrative difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include such as pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

Reactive surfactants may be used to form the resin particles of the monodisperse latex. Suitable reactive surfactants comprise a polymerizable (and thus, reactive) group such that they become incorporated into the resin particles. Illustrative reactive surfactants include anionic ether sulfate reactive surfactants such as those in the commercially available Hitenol BC series such as Hitenol BC10-25. Other suitable reactive surfactants include polyoxyethylene alkylphenyl ether ammonium sulfate, Hitenol BC-10, BC-20, BC-2020, BC-30; polyoxyethylene styrenated phenyl ether ammonium sulfate including Hitenol AR-10, AR-20, AR10-25, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the monodisperse latex. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In forming the monodisperse latex, any of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles/latex. However, it has been found that the following amounts are useful for achieving resin particles having small sizes and narrow size distributions.

Acidic monomers may be used in the monomer emulsion in an amount in a range of from 1.5 weight % to 15 weight %. (Here, weight % refers to the (total weight of acidic monomers)/(total weight of monomers in the monomer emulsion, excluding the reactive surfactants)*100). This range includes from 5 weight % to 10 weight %. As noted above, two different types of acidic monomers having different $pK_a$ values may be used in the weight ratios described above. Hydrophilic monomers may be used in the monomer emulsion in an amount in a range of from 0 weight % to 5 weight %. (Weight % has a meaning analogous to that described for acidic monomers.) This range includes from 0.1 weight % to 5% weight % and from 1 weight % to 5 weight %. Multifunctional monomers, including difunctional monomers, may be used in the monomer emulsion in an amount in a range of from 0.01 to 5 weight %, from 0.1 weight % to 5 weight %, or from 0.1 weight % to 1 weight %. (Weight % has a meaning analogous to that described for acidic monomers.) Other monomers, (e.g., styrenes, alkyl (meth)acrylates) may be present in an amount in a range of from 70 weight % to 97 weight %. (Weight % has a meaning analogous to that described for acidic monomers.) This range includes from 75 weight % to 90 weight %.

Together, the amount of acidic monomers, hydrophilic monomers, and multifunctional monomers (e.g., hydrophilic multifunctional monomers) may be present in the monomer emulsion in a range of from 1.5 weight % to 12 weight %. (Here, weight % refers to the (total weight of acidic monomers, hydrophilic monomers, and multifunctional monomers)/(total weight of monomers in the monomer emulsion, excluding the reactive surfactants)*100.) This range includes from 2 weight % to 12 weight %, and from 5 weight % to 10 weight %.

Reactive surfactants may be used in the monomer emulsion an amount in a range of from 1.5 weight % to 6.5 weight %. (Here, weight % refers to the (total weight of reactive surfactants)/(total weight of monomers in the monomer emulsion, including the reactive surfactant monomers) *100.) This range includes from 1.5 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent (e.g., water), a styrene, an alkyl acrylate (e.g., butyl acrylate), an acidic monomer, a multifunctional monomer (e.g., a difunctional monomer), a reactive surfactant, and a chain transfer agent. In such embodiments, one type or different types of the various monomers may be used. Similarly, one type or different types of the solvent and/or one type or different types of the chain transfer agent may be used. In embodiments, the monomer emulsion comprises (or consists of) a solvent (e.g., water), a styrene, an alkyl acrylate (e.g., butyl acrylate), a methacrylic acid, a hydrophilic monomer (e.g., a poly(propylene glycol) methacrylate), a multifunctional monomer (e.g., a difunctional monomer), a reactive surfactant, and a chain transfer agent. In embodiments, the monomer emulsion comprises (or consists of) a solvent (e.g., water), a styrene, an alkyl acrylate (e.g., butyl acrylate), two different types of acidic monomers (e.g., a methacrylic acid and a sulfonic acid), a difunctional monomer (e.g., a poly(ethylene glycol) diacrylate), a reactive surfactant, and a chain transfer agent. In any of these embodiments, amounts of the various monomers and chain transfer agents may be used as described above. The balance may be made up of the solvent.

At least in embodiments, the monomer emulsion is free of (i.e., does not comprise) a surfactant. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, and block copolymer of polyethylene oxide and polypropylene oxide. Thus, the monomer emulsion may be free of (i.e., does not comprise) any of these surfactants.

The present methods for forming the monodisperse latex comprise adding any of the monomer emulsions described above to a reactive surfactant solution at a feed rate over a period of time. The reactive surfactant solution comprises a solvent and a reactive surfactant. Any of the solvents and any of the reactive surfactants described above may be used. One type or different types of solvent and/or reactive surfactants may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight %. (Here, weight % refers to the (total weight of reactive surfactants)/(total weight of reactive surfactant solution)*100.) This range includes from 2 weight % to 5 weight %. The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to the addition of the monomer emulsion. One type or different types of solvent and/or initiators may be used. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis [N-(4-chlorophenyl)-2-methylpropionamidine]di-hydrochloride, 2,2'-azobis[N-(4-hydroxyphenyl)-2-methylpropionamidine]dihydrochloride, 2,2'-azobis[N-(4-aminophenyl)-2-methylpropionamidine ]tetrahydrochloride, 2,2'-azobis[2-methyl-N-(phenylmethyl)propionamidine] dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl) propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochlo- ride, 2,2'-azobis[2-(5-hydroxy-3,4,5,6-tetrahydropyrimidin-2-yl) propane]di- hydrochloride, 2,2'-azobis {2-[1-(2-hydroxyethyl)-2-imidazolin-2-yl]propane}dihydrochloride, and combinations thereof. The initiator may be used in an amount in a range of from 0.1 weight % to 2.5 weight %. (Here, weight % refers to the (total weight of initiators)/ (total weight of reactive surfactant solution)*100.)

In embodiments, the reactive surfactant solution comprises (or consists of) a solvent (e.g., water), a reactive surfactant, and optionally, one or more of an initiator and a buffer. In such embodiments, one type or different types of these components may be used. In any of these embodiments, amounts of the reactive surfactants, initiator, and buffer may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion is added at a feed rate over a period of time. In the presence of the initiator, the monomers of the monomer emulsion undergo polymerization reactions to form the resin particles of the monodisperse latex. The feed rate is sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time. Illustrative additional periods of time include those in a range of from 1 hour to 18 hours. Both the addition of the monomer emulsion and the polymerization after addition may be carried out under the inert gas and at the elevated temperature. Optionally, the latex formed may be processed by standard techniques such as coagulation, dissolution and precipitation, filtering, washing, or drying. If solvent/water is removed from the latex, e.g., via drying, the dried latex still comprises the resin particles, which may be used to form the aqueous inkjet ink composition described below. Thus, any of the disclosed aqueous inkjet ink compositions may simply comprise the resin particles of any of the disclosed latexes.

It is noted that, at least in embodiments, the present methods do not involve the use of a resin seed in forming the resin particles of the monodisperse latex. This is by contrary to existing processes which make use of resin seeds in order to initiate and stabilize polymerization. Thus, in such embodiments, neither the monomer emulsion nor the reactive surfactant solution comprises such a resin seed. The polymerization reactions that form the resin particles also do not involve such a resin seed. Similarly, at least in embodiments, the present methods do not involve the use of any of the surfactants (other than the reactive surfactant monomers) described above.

The present methods may further comprise forming the monomer emulsion, forming the reactive surfactant solution, and/or forming the initiator solution. Each may be formed by combining the desired components at the desired amounts and mixing.

As noted above, the monodisperse latex formed by the present methods comprises resin particles having a small size and narrow distribution. The composition of the resin particles depends upon the selection of the monomers and their relative amounts and the polymerization reactions between selected monomers that produce a polymerization product as described above. Thus, a variety of compositions are encompassed based on the description above, including those based on various polymerization products of reactants comprising various combinations of monomers. However, in embodiments, the resin particles comprise (or consist of) the polymerization product (e.g., a copolymer) of reactants comprising a styrene, an alkyl acrylate (e.g., butyl acrylate), an acidic monomer, a multifunctional monomer (e.g., a difunctional monomer), and a reactive surfactant. In such embodiments, one type or different types of the various monomers may be present. In embodiments, the resin particles comprise (or consist of) the polymerization product of reactants comprising a styrene, an alkyl acrylate (e.g., butyl acrylate), a methacrylic acid, a hydrophilic monomer (e.g., a poly(propylene glycol) methacrylate), a multifunctional monomer (e.g., a difunctional monomer), and a reactive surfactant. In embodiments, the resin particles comprise (or consist of) the polymerization product of reactants comprising a styrene, an alkyl acrylate (e.g., butyl acrylate), two different types of acidic monomers (e.g., a methacrylic acid and a sulfonic acid), a difunctional monomer (e.g., a poly (ethylene glycol) diacrylate), and a reactive surfactant. In each of these embodiments, an initiator may be incorporated at the beginning and end of each polymer chain in the resin particles. In each of these embodiments, the resin may be crosslinked due to the multifunctional/difunctional monomer. In each of these embodiments, the monomers may be present in the resin particles in the amounts described above.

The resin particles of the present monodisperse latexes may be characterized by their size. The size may be reported as a $D_{(z,\,ave)}$ value, measured using a nanoparticle analyzer such as a Malvern Nano-Zetasizer. In embodiments, the $D_{(z,\,ave)}$ is no greater than 150 nm, no greater than 120 nm, no greater than 110 nm, no greater than 100 nm, or in a range of from 60 nm to 150 nm or from 60 nm to 100 nm.

Similarly, the resin particles of the present monodisperse latexes may be characterized by their size distribution. The size distribution may be reported as a polydispersity index (PDI), measured using a nanoparticle analyzer such as a Malvern Nano-ZS. In embodiments, the PDI is no greater than 0.1, no greater than 0.050, no greater than 0.025, no greater than 0.010, no greater than 0.005 or in a range of from 0.001 to 0.1.

Due to their small size and narrow size distribution, the resin particles of the present monodisperse latexes may further be characterized as being free of (i.e., not comprising) large particles. This may be evidenced by a $D_{(v,\,90)}$ value of less than 200 nm, less than 175 nm, or less than 150 nm.

The small size and narrow size distribution of the present monodisperse latexes may be further evidenced by the ability to form three-dimensional (3D) photonic crystals upon removal of solvent (i.e., drying) from the latex. Such crystal formation is possible because of the uniform size of the resin particles. Local crystallization and the ability to form the 3D photonic crystals may be confirmed using scanning tunneling electron microscopy (STEM). (See FIG. 3.) Controlled heating may be used to achieve the 3D photonic crystals.

Aqueous Inkjet Ink Compositions

Any of the monodisperse latexes described above may be used to provide an aqueous inkjet ink composition. As noted above, it is believed that the small size and narrow distribution of the resin particles of the latexes contribute, at least in part, to greatly improved stability and printing performance of the aqueous inkjet ink compositions. The latex may be present in the aqueous inkjet ink composition in an amount in a range of from 1 weight % to 10 weight %. (Here, weight % refers to the (total weight of dry latex)/(total weight of aqueous inkjet ink composition)*100.) This range includes from 5 weight % to 10 weight %. A variety of other components may be used to form the aqueous inkjet ink compositions as described below.

Solvent System

The aqueous inkjet ink compositions comprise a solvent system based on water. The solvent system can consist solely of water, or can comprise a mixture of water and a water-soluble and/or water-miscible organic solvent. The water-soluble and water-miscible organic solvents may be referred to herein as a co-solvent or a humectant. Suitable such organic solvents include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, glycerine, dipropylene glycols, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, and 2,4-heptanediol. Other suitable solvents include amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these organic solvents may be used.

Suitable water-soluble and/or water-miscible organic solvents include a glycol of hydrocarbons having a carbon number of 4 to 7. Examples of such a glycol include 1,2-pentane diol; 1,2-hexanediol; 1,5-pentanediol; 1,6-hexanediol; 3-methyl-1,3 -butanediol; 1,2-butanediol; 2,4-pentanedi ol; 1,7-heptanediol; 3-methyl-1,5 -pentanediol; trimethylolpropane; ethyleneurea; 1,2,6-hexantriol; 1,2,3-butanetriol; sorbitol; urea; diethylene glycol; 1,2,4-butanetriol; glycerol; diglycerol; triethylene glycol; polyethylene glycol 200; and polyethylene glycol 600.

In embodiments, the solvent system comprises water, a 1,2-alcohol (e.g., 1,2-hexanediol), a glycol (e.g., propylene glycol), and a glycerol.

In solvent systems comprising water and an organic solvent, the water to organic solvent weight ratio, as well as the type and relative amount of different organic solvents, may be selected to achieve certain properties for the aqueous inkjet ink composition such as a desired surface tension, viscosity, etc. In embodiments, the water to organic solvent weight ratio is from 90:10 to 51:49. If more than one organic solvent is used, these weight ratios refer to the total amount of organic solvent. As water may be present in the latex, colorant, etc., these weight ratios refer to the total amount of water.

Similarly, various total amounts of the solvent system may be used in the aqueous inkjet ink compositions. In embodiments, the solvent system is present in an amount of from 50 weight % to 95 weight %, from 60 weight % to 90 weight %, or from 65 weight % to 90 weight %. (Here, weight % refers to the (total weight of solvent system)/(total weight of aqueous inkjet ink composition)*100.) In embodiments, the total amount of water present is at least 50 weight %, at least 60 weight %, at least 80 weight %, or in a range of from 50 weight % to 95 weight %. (Here, weight % refers to the (total weight of water)/(total weight of aqueous inkjet ink composition)*100.)

Water-soluble Resin

A water-soluble resin may be used in the aqueous inkjet ink composition. The type and the amount may be also selected to achieve a desired viscosity. Illustrative water-soluble resins include polyethylene glycol and polyvinylpyrrolidone. Molecular weights for the water-soluble resins may be in a range of from 1000 g/mol to 10,000 g/mol. However, it has been found that at least some embodiments of the aqueous inkjet ink compositions are surprisingly sensitive to the type and molecular weight of the water-soluble resin. This finding is further described in the Examples, below. In embodiments, the water-soluble resin is polyethylene glycol having a molecular weight in a range of from 3000 g/mol to 9000 g/mol, from 3000 g/mol to 7000 g/mol, from 3000 g/mol to 5000 g/mol, or 4000 g/mol. These molecular weight values may be determined using gel permeation chromatography. In embodiments, the amount of the water-soluble resin is selected such that the total solids content (generally provided by the latex, the water-soluble resin, and the colorant) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

The aqueous inkjet ink composition may further comprise other binder resins including acrylic polymers such as styrene-acrylic copolymers and vinylpyrrolidone copolymers, urethane or polyurethane dispersions, and acrylic-urethane hybrid dispersions. More specific binder resins that can be used include those available from Johnson Polymers (BASF) such as Joncryl 661, Joncryl 8003, Joncryl 8078, Joncryl 8082, Joncryl 537, Joncryl H538, Joncryl H538, Joncryl including the name of HPD 71E. Other exemplary water-soluble resins include Rhoplex I-1955, Rhoplex I-2426D, Rhoplex I-62, Rhoplex I-98, Rhoplex E-1691, available from Rhohm & Haas. Others include Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP.

Colorant

The aqueous inkjet ink composition may comprise a colorant. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such as cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation).

The above list of pigments includes unmodified pigment particulates, small molecule attached pigment particulates, and polymer-dispersed pigment particulates.

In forming the aqueous inkjet ink compositions, the colorant(s) may be provided as a colorant dispersion comprising the colorant and a solvent (e.g., water). The colorant may be in the form of a particle and have an average particle size of from 20 nm to 500 nm, from 20 nm to 400 nm, or from 30 nm to 300 nm.

Various amounts of colorant may be used in the aqueous inkjet ink compositions. Generally, however, an amount is selected such that the total solids content (generally provided by the latex, the water-soluble resin, and the colorant) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

Surfactant

Unlike the monodisperse latex described above, the aqueous inkjet ink compositions may comprise one or more surfactants. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-s-7, Tergitol™ 15-s-9, TMN-6, TMN-100x and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-'761p, S-'764p, Silsurf® A008, Siltec® C-408, BYK 345, 346, 347, 348 and 349, polyether siloxane copolymer TEGO® Wet-260, 270 500, etc. Some amphoteric fluorinated surfactants can also be used such as alkyl betaine fluorosurfactant or alkyl amine oxide fluorosurfactant such as Chemguard S-500 and Chemguard S-111.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition) *100.) If more than one type of surfactant is used, these amounts refer to the total amount of surfactant.

Additives

Various additives may be used in the aqueous inkjet ink compositions to tune the properties thereof. Suitable additives include one or more of biocides; fungicides; stabilizers;

pH controlling agents such as acids or bases, phosphate salts, carboxylates salts, sulfite salts, amine salts, buffer solutions; sequestering agents such as EDTA (ethylenediamine tetra acetic acid); defoamers; and wetting agents.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

In at least embodiments, the present aqueous inkjet ink compositions are free of (i.e., do not comprise) a coagulant and are free of (i.e., do not comprise) a coalescing agent and are free of (i.e., do not comprise) a plasticizer. In embodiments, the ink compositions are free of (i.e., do not comprise) any pyrrolidone-based solvents such as N-methylpyrrolidone, and are free of (i.e., do not comprise) Texanol and Texanol isobutyrate.

Similarly, the present aqueous inkjet ink compositions may be free of (i.e., do not comprise) a resin other than those provided by the present monodisperse latexes. A single type of monodisperse latex may be used.

In embodiments, the aqueous inkjet ink composition comprises (or consists of) a solvent system; a monodisperse latex; a colorant; and optionally, one or more of a water-soluble resin and an additive. In embodiments, the aqueous inkjet ink composition comprises (or consists of) a solvent system; a monodisperse latex; a colorant; a water-soluble resin; and optionally, an additive. In any of these embodiments, the additives may be selected from a stabilizer, a surfactant, a defoamer, a wetting agent, and a biocide. In any of these embodiments, the components may be selected from any of the solvent systems, monodisperse latexes, colorants, water-soluble resins, and additives disclosed herein. In any of these embodiments, amounts of the components may be used as described above. In any of these embodiments, a single type of monodisperse latex may be used. In any of the embodiments in this paragraph, the phrase "monodisperse latex" may be replaced with "resin particles."

The aqueous inkjet ink compositions may be formed by combining the desired components at the desired amounts and mixing. An illustrative method comprises adding any of the disclosed monodisperse latexes (or the resin particles) to a colorant dispersion to form a first mixture; and adding a second mixture comprising a solvent system and an additive(s) to the first mixture to form the aqueous inkjet ink composition. Mixing and/or heating may be used during the method. The aqueous inkjet ink composition may be filtered prior to use. Illustrative details are provided in the Examples, below.

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet. Illustrative substrates include McCoy® Gloss #100 coated substrate, Xerox® Bold uncoated substrate, Kodak photo paper, Sterling® Ultra Web Matte (offset coated), TrueJet® Gloss Text (Inkjet treated coated), and McCoy® Silk (offset coated).

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1

A reactive surfactant solution of 1.6 grams (Hitenol BC1025 from Montello), 36 grams deionized water and 0.4 g $NaHCO_3$ was prepared by mixing in a glass reactor. The reaction was then purged with nitrogen for 30 minutes. The reactor was then continuously purged with nitrogen while being stirred at 250 rpm. The reactor was then heated up to 85° C. and held there. Separately, 0.2 grams of ammonium persulfate initiator was dissolved in 5 grams of deionized water and added to the reactor.

Separately, a monomer emulsion was prepared in the following manner: 30 g of styrene, 5 g of butyl acrylate, 3 g of methacrylic acid, 1.5 g of polypropylene glycol methacrylate 370, 0.6 g of 1-dodecanethiol (DDT), 0.12 g of PEGDA 250, 0.8 g of Hitenol BC 1025, and 15 g of deionized water were mixed with intermittent mixing to form an emulsion. The emulsified mixture was fed to the reactor slowly for 3 h and the reaction continued for 15 h. The resulting latex was passed through a 25 µm filter and neutralized to pH 8.0 with 0.5 M KOH solution.

A Malvern Nano-ZS was used to analyze the dimensions of the resin particles. The distribution of sizes of the resin particles of the resulting latex are shown in FIG. 1. The peak at 101.0 nm has a width of 25.16 nm and includes 100% by volume of the resin particles. Other parameters were as follows: $D_{(v, 10)}$=71 nm, $D_{(v, 50)}$=97 nm, and $D_{(v, 90)}$=138 nm; $D_{(z, ave)}$=110 nm, and PDI=0.004.

STEM images of the dried latex showed local crystallization, demonstrating the ability to form three-dimensional (3D) photonic crystals.

Example 2

A reactive surfactant solution of 1.6 grams (Hitenol BC1025 from Montello), 36 grams deionized water, and 0.4 g NaHCO$_3$ was prepared by mixing in a glass reactor. The reaction was then purged with nitrogen for 30 minutes. The reactor was then continuously purged with nitrogen while being stirred at 250 rpm. The reactor was then heated up to 85° C. and held there. Separately, 0.2 grams of ammonium persulfate initiator was dissolved in 5 grams of deionized water and added to the reactor.

Separately, a monomer emulsion was prepared in the following manner: 31 g of styrene, 5 g of butyl acrylate, 3 g of methacrylic acid, 0.5 g of styrenesulfonic acid, 0.6 g of 1-dodecanethiol (DDT), 0.12 g of PEGDA 250, 0.6 g of Hitenol BC 1025, and 15 g of deionized water were mixed with intermittent mixing to form an emulsion. The emulsified mixture was fed to the reactor slowly for 3 h and the reaction continued for 15 h. The resulting latex was passed through a 25 μm filter and neutralized to pH 8.0 with 0.5 M KOH solution.

Figure 2:
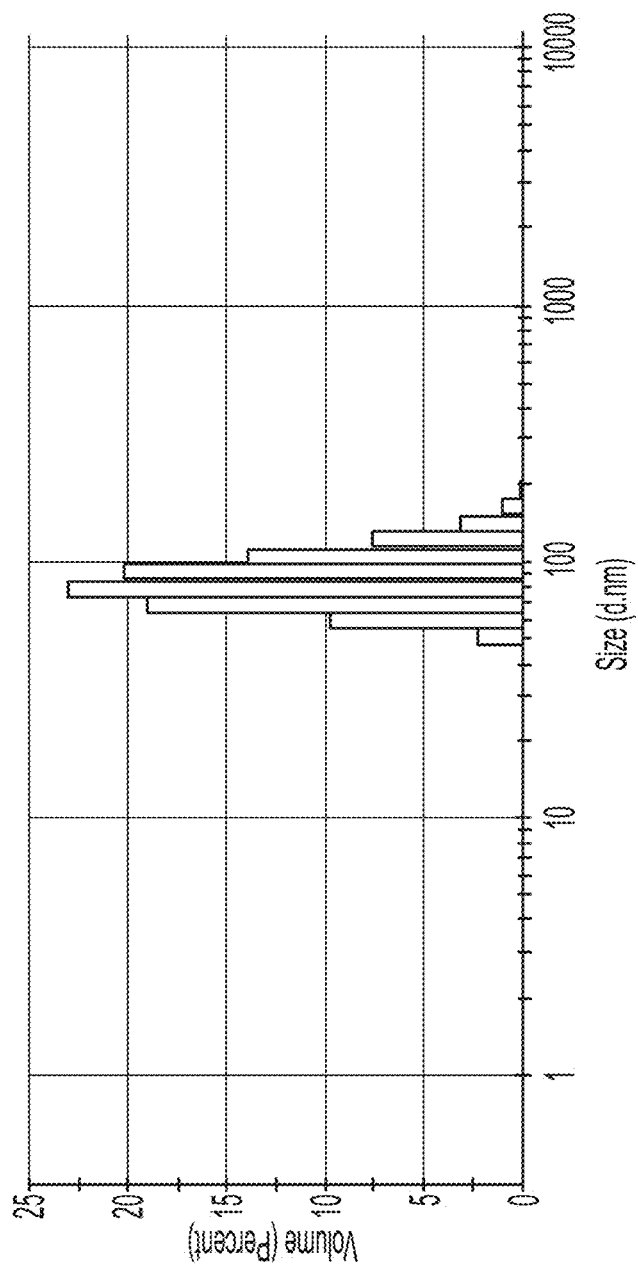
FIG. 2 shows the size distribution of resin particles of another monodisperse latex formed according to an illustrative embodiment of the present methods.

A Malvern Nano-ZS was used to analyze the dimensions of the resin particles. The distribution of sizes of the resin particles of the resulting latex are shown in FIG. 2. The peak at 86.74 nm has a width of 22.49 nm and includes 100% by volume of the resin particles. Other parameters were as follows: $D_{(v, 10)}$=61 nm, $D_{(v, 50)}$=83 nm, and $D_{(v, 90)}$=119 nm, $D_{(z, ave)}$=95 nm, and PDI=0.023.

Figure 3:
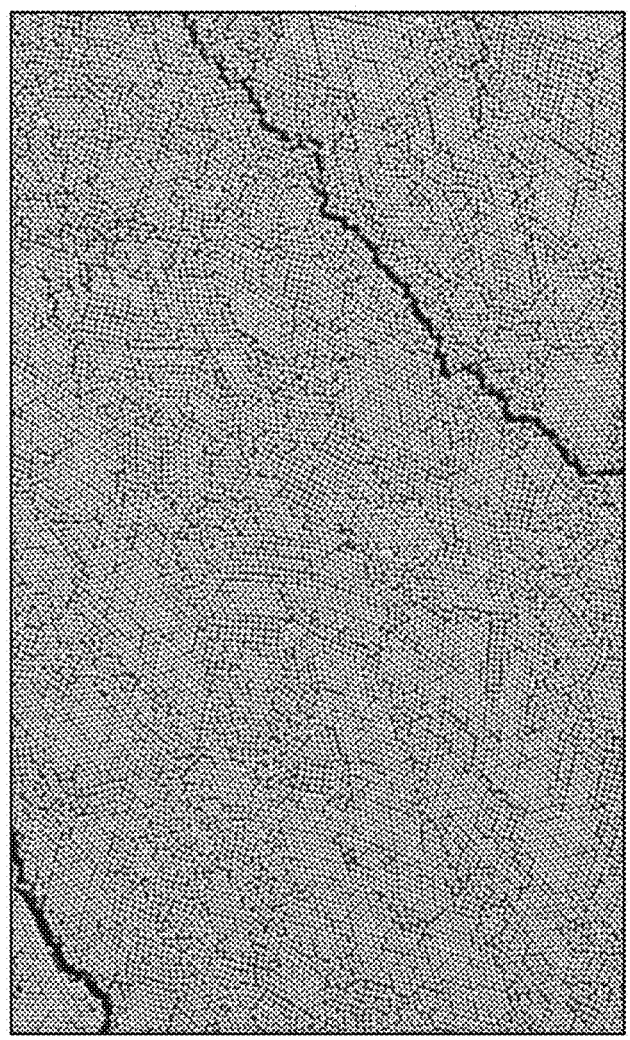
FIG. 3 shows a scanning transmission electron microscope (STEM) image of a dried monodisperse latex formed according to an illustrative embodiment of the present methods. This image shows local crystallization and demonstrates the ability to form three-dimensional (3D) photonic crystals.

As shown in FIG. 3, STEM images of the dried latex show local crystallization and demonstrates the ability to form three-dimensional (3D) photonic crystals.

Example 3

An aqueous inkjet ink composition was formed using the latex of Example 2. The following steps were used to form the aqueous inkjet ink composition shown in Table 1, below:

1. The pigment dispersion was added to deionized water and mixed for about 15 minutes at a speed of about 950 RPM, using a pitched blade propeller.

2. The latex of Example 2 was added slowly to the pigment dispersion and mixed for about 45 minutes (Mixture A).

3. In a separate beaker, the water-soluble resin, the co-solvents, humectant, stabilizer, surfactant, and wetting agent were mixed to form a homogenous mixture (Mixture B).

4. Mixture B was slowly added into Mixture A. Once the addition was complete, the mixer speed was set to about 650 RPM and the components were allowed to mix for another ~75 minutes.

5. The defoamer was added and mixing continued for about another 15 minutes.

6. After mixing, the ink composition was left at room temperature for about 60 minutes before checking pH, conductivity and surface tension.

7. The ink composition was left overnight and then filtered (KST-47 filtration apparatus available from Advantec MFS, Inc.) through a glass fiber filter (0.45 μm or 1 μm).

TABLE 1

Aqueous Inkjet Ink Composition

| Component | Chemical | Amount |
|---|---|---|
| Solvent | Water | 8.95 |
| Colorant | CAB-O-JET ® 450 (15% solids) | 28 |
| Latex | Latex of Example 2 | 7.7 |
| Water-Soluble Resin | PEG 4000 (15% solids) | 16.65 |
| Co-solvent 1 | 1,2-hexanediol | 7 |

TABLE 1-continued

Aqueous Inkjet Ink Composition

| Component | Chemical | Amount |
|---|---|---|
| Co-solvent 2 | Propylene glycol | 28.5 |
| Humectant | Glycerol | 2 |
| Stabilizer | Triethanolamine | 0.4 |
| Defoamer | BYK024 | 0.2 |
| Surfactant | Silicone (Byk 349) | 0.5 |
| Wetting Agent | Multifunctional nonionic surfactant Surfynol 104 H (75% active) | 0.1 |
| Total % | | 100 |

Stability

The particle size and PDI of the particles of the ink composition were measured before and after air oven aging at 60° C. for 3 days using a Malvern Nano-Zetasizer. The results are shown in Table 2. The minimal change in $D_{(z, ave)}$ (~4%) and no change in PDI demonstrates that the ink composition was extremely stable. In addition, the change in viscosity of the ink was negligible (less than 2%) after air oven aging at 60° C. for 3 days.

TABLE 2

Stability of Aqueous Inkjet Ink Composition.

| Condition | $D_{(z, ave)}$ (nm) | PDI | $D_{(v,10)}$ (nm) | $D_{(v, 50)}$ (nm) | $D_{(v, 90)}$ (nm) |
|---|---|---|---|---|---|
| Before | 88 | 0.25 | 54 | 87 | 165 |
| After air oven aging at 60° C. for 3 days | 84 | 0.25 | 46 | 76 | 158 |

Printing Performance

The ink composition was jetted using a Dimatix DMP2800 printer on different paper substrates, including Kodak photo paper, McCoy® gloss #100 and Xerox® Bold. The test key parameters used were as follows: Drop mass=4.5–4.8 ng, Drop velocity =7 m/s, frequency =5 kHz, Voltage=16–20 V, printing temperature was 20° C. to 40° C. The print parameter was a 600×600 dpi print. The measurement was done using a PIAS II instrument, which is a personal image analysis system with a digital loupe. The high-resolution optic module ~5 μm/pixel was used which has a field view of ~3.2 mm×2.4 mm to measure the dot size and diameter. The results are shown in Table 3. In addition, the ink composition passed continuous jetting for >25 minutes demonstrating excellent latency.

TABLE 3

Printing Performance of Aqueous Inkjet Ink Composition.

| Substrate | Dot diameter (μm) | Line width (mm) | Circularity | Optical Density |
|---|---|---|---|---|
| McCoy gloss #100 | 51.7 | 0.044 | 1.0 | ~1.0 |
| Xerox Bold | 55.4 | 0.055 | 1.0 | ~1.0 |

Shelf-Life

After the jetting of the ink composition, the ink composition was kept in the same printing cartridge for eight days at room temperature. After eight days, the ink composition was jetted again. All the nozzles started jetting without any sign of blockage. All nozzles jetted continuously for >15 minutes before the test was stopped. This experiment further demonstrates the extended shelf-life and colloidal stability of the ink composition.

Example 4

A series of experiments were conducted to investigate the effect of the water-soluble resin in a latex-free version of the aqueous inkjet ink composition. Table 4, below, lists the samples prepared. Table 5, below, lists the printing parameters tested and the results.

designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and

TABLE 4

Latex-free Aqueous Inkjet Ink Compositions.

| Component | Chemical | Amount in 100 g formulation | Control | A | B | C | D | E | F |
|---|---|---|---|---|---|---|---|---|---|
| Solvent | Water | 33.62 | 10.09 | 1.41 | 4.09 | 5.29 | 5.97 | 1.66 | 2.01 |
| Colorant | CAB-O-JET ® 450 (15% solids) | 28 | 19.91 | 19.91 | 19.91 | 19.91 | 19.91 | 19.91 | 19.91 |
| Latex | Latex of Example 2 | 0 | | | | | | | |
| Co-solvent 1 | 1,2-hexanediol | 6.3 | | | | | | | |
| Co-solvent 2 | Propylene glycol | 28.3 | | | | | | | |
| Humectant | Glycerol | 2 | | | | | | | |
| Stabilizer | Triethanolamine | 0.9 | | | | | | | |
| Surfactant | Byk 349 | 0.5 | | | | | | | |
| Wetting Agent | Surfynol 104H (75% active) | 0.38 | | | | | | | |
| Water-Soluble Resin | PEG 1450 (15% solids) | | | 8.68 | | | | | |
| | PEG 4000 (15% solids) | | | | 6 | | | | |
| | PEG 6000 (15% solids) | | | | | 4.8 | | | |
| | PEG 8000 (15% solids) | | | | | | 4.12 | | |
| | PVP 3500 (15% solids) | | | | | | | | 8.43 |
| | PVP 8000 (15% solids) | | | | | | | | 8.08 |
| Total (g) | | 100 | 30.0 | 30.0 | 30.0 | 30.0 | 30.0 | 30.0 | 30.0 |
| Viscosity Zero-shear (cP) at 23.3° C. | | | 6.1 | 8.43 | 8.76 | 8.6 | 8.99 | 7.98 | 8.41 |

TABLE 5

Printing Performance of Latex-free Aqueous Inkjet Ink Compositions.

| Printing Parameter | Control | A | B | C | D | E | F |
|---|---|---|---|---|---|---|---|
| Print Head Temperature (° C.) | 32 | 37 | 37 | 37 | 37 | 37 | 37 |
| Drop Mass (ng) | 4.5 | 4.8 | 4.8 | 4.9 | 4.9 | 4.8 | 4.9 |
| Drop Velocity (m/s) | 6 | 7 | 7 | 6 | 6 | 6 | 6 |
| Voltage (V) | 15 | 17 | 17 | 18 | 17 | 17 | 17 |
| Jetting Comments | Very good | Poor | Good | Acceptable | Acceptable | Poor | Good |
| Front Face | Very clean | Significant sputtering | No sputtering | Some sputtering | Some sputtering | Significant Sputtering | Some sputtering |
| Latency | Very good | Poor | Good | Poor | Poor | Poor | Very good |

The results show that although all the water-soluble resins achieve acceptable viscosity, the printing performance is highly sensitive to the type and molecular weight of the water-soluble resin used. The best performance is achieved with PEG 4000.

The word "illustrative" is used herein to mean serving as an example, instance, or illustration. Any aspect or design described herein as "illustrative" is not necessarily to be construed as preferred or advantageous over other aspects or designs.

modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An aqueous inkjet ink composition comprising water; resin particles; and a colorant; wherein the resin particles comprise a polymerization product of reactants comprising a monomer, an acidic monomer, a multifunctional monomer, and a reactive surfactant comprising a polymerizable group, the resin particles having a $D_{(z, \, ave)}$ of no greater than about 150 nm, a $D_{(v, \, 90)}$ of less than about 200 nm, and a polydispersity index (PDI) of no greater than about 0.050.

2. The aqueous inkjet ink composition of claim 1, wherein the polymerization product comprises the monomer, two different acidic monomers having $pK_a$ values that differ from one another by at least about 2 units, the multifunctional monomer, and the reactive surfactant.

3. The aqueous inkjet ink composition of claim 2, wherein the two different acidic monomers are present at a weight ratio of acidic monomer having a higher $pK_a$ to acidic monomer having a lower $pK_a$ in a range of from about 0.1 to about 10.

4. The aqueous inkjet ink composition of claim 2, wherein the two different acidic monomers are methacrylic acid and a sulfonic acid monomer.

5. The aqueous inkjet ink composition of claim 4, wherein the sulfonic acid monomer is styrenesulfonic acid.

6. The aqueous inkjet ink composition of claim 1, wherein the reactants comprise styrene, an alkyl acrylate, methacrylic acid, a sulfonic acid monomer, a poly(ethylene glycol) diacrylate, and an anionic ether sulfate reactive surfactant.

7. The aqueous inkjet ink composition of claim 6, wherein the sulfonic acid monomer is styrenesulfonic acid.

8. The aqueous inkjet ink composition of claim 1, wherein the resin particles have a $D_{(z, \, ave)}$ of no greater than about 120 nm, a $D_{(v, \, 90)}$ of less than about 150 nm, and a PDI of no greater than about 0.025.

9. The aqueous inkjet ink composition of claim 1, wherein the resin particles crystallize to form a 3D-photonic crystal upon drying a latex comprising the resin particles.

10. The aqueous inkjet ink composition of claim 1, further comprising a water-soluble resin.

11. The aqueous inkjet ink composition of claim 10, wherein the water-soluble resin is polyethylene glycol having a molecular weight of about 4000 g/mol.

12. The aqueous inkjet ink composition of claim 1, further comprising a water-soluble resin and wherein the reactants comprise styrene, an alkyl acrylate, methacrylic acid, a sulfonic monomer, a poly(ethylene glycol) diacrylate, and an anionic ether sulfate reactive surfactant.

13. The aqueous inkjet ink composition of claim 12, wherein the water-soluble resin is polyethylene glycol having a molecular weight of about 4000 g/mol and the sulfonic acid monomer is styrenesulfonic acid.

14. A method of forming the aqueous inkjet ink composition of claim 1, the method comprising adding a latex comprising the resin particles to a colorant dispersion comprising the colorant to form the aqueous inkjet ink composition.

15. A method of using the aqueous inkjet ink composition of claim 1, the method comprising ejecting droplets of the aqueous inkjet ink composition of claim 1 onto a substrate to form an image thereon.

16. The aqueous inkjet ink composition of claim 4, wherein a total amount of the acidic monomer is present in the resin particles at an amount in a range of from about 1.5 weight % to about 15 weight %.

17. The aqueous inkjet ink composition of claim 1, wherein the resin particles consist of the polymerization product of the reactants and the reactants consist of styrene, an alkyl acrylate, methacrylic acid, a sulfonic acid monomer, a poly(ethylene glycol) diacrylate, an anionic ether sulfate reactive surfactant, a chain transfer agent, and an initiator.

18. The aqueous inkjet ink composition of claim 17, wherein the methacrylic acid and the sulfonic acid monomer, together, are present in the resin particles at an amount in a range of from about 5 weight % to about 10 weight %, and further wherein the methacrylic acid, the sulfonic acid monomer, and the poly(ethylene glycol) diacrylate, together, are present in the resin particles at an amount in a range of from about 2 weight % to about 12 weight %.

19. The aqueous inkjet ink composition of claim 18, consisting of the water, the resin particles, the colorant, a water-soluble resin, a 1,2-alcohol, a glycol, glycerol, a stabilizer, and surfactants.

20. The aqueous inkjet ink composition of claim 19, wherein the water-soluble resin is polyethylene glycol having a molecular weight of about 4000 g/mol, the 1,2-alcohol is 1,2-hexanediol, the glycol is propylene glycol, and the stabilizer is triethanolamine.

* * * * *